UNITED STATES PATENT OFFICE.

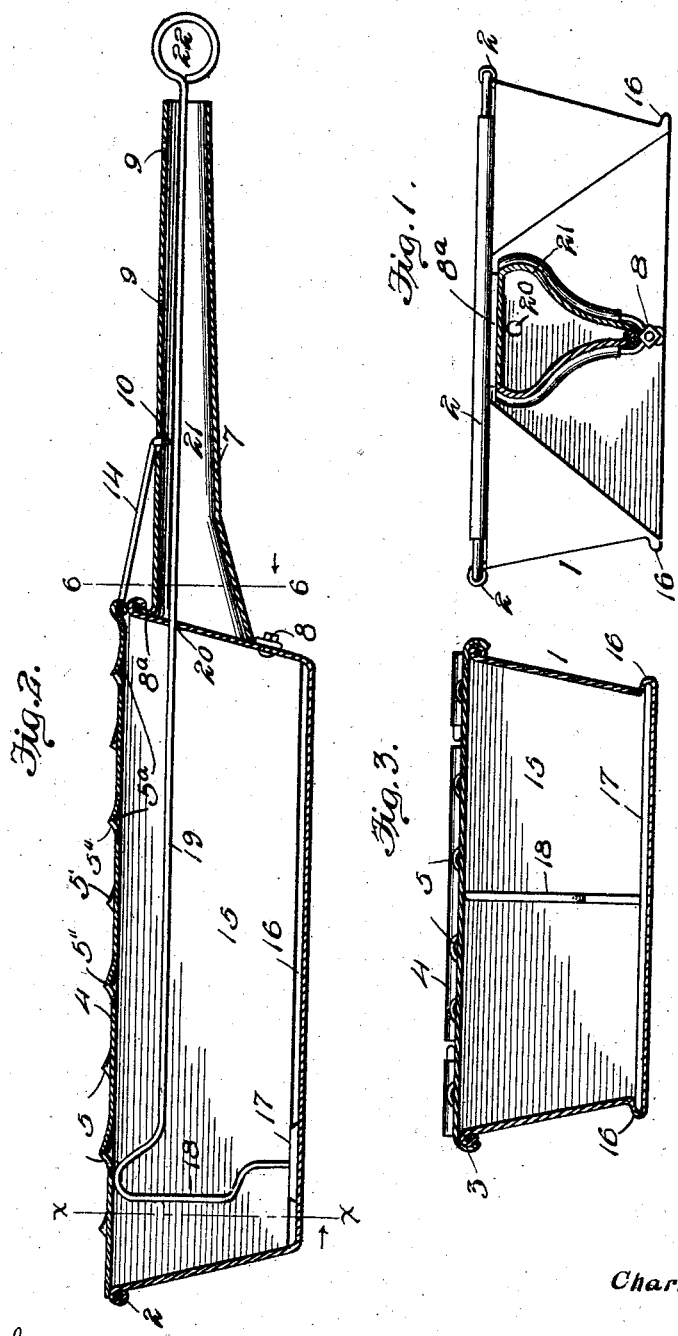

CHARLES GABEL, OF HAWKEYE, IOWA.

CORN-POPPER.

974,048.

Specification of Letters Patent.

Patented Oct. 25, 1910.

Application filed February 18, 1909. Serial No. 478,727.

*To all whom it may concern:*

Be it known that I, CHARLES GABEL, a citizen of the United States, residing at Hawkeye, in the county of Fayette and State of Iowa, have invented certain new and useful Improvements in Corn-Poppers, of which the following is a specification, reference being had therein to the accompanying drawing.

My present invention relates to an improved corn popper, the main object of my invention being the provision of a corn popper having novel features of construction, both as to the receptacle and cover, which may also be used as a kraut cutter.

I further provide an agitator, which is operable from the exterior to agitate the corn while popping so as to prevent the same burning and adhering to the bottom of the receptacle.

To clearly illustrate my invention, attention is invited to the accompanying drawings, in which:—

Figure 1 is an end view of a receptacle taken from the handle end, and having the handle in section, said section being taken on line 6—6 Fig. 2. Fig. 2 is a longitudinal section of a modified form of popper. Fig. 3 is a cross section on line $x$—$x$, Fig. 2.

Referring to the drawings:—the numeral 1 designates the rectangular receptacle or hopper, which is preferably made of tin, and provided with the rolled and wired rim 2, the sides of which are slidably engaged by means of the flanges 3, of the lid or cover 4. The cover as shown in Figs. 2 and 3, is provided with the perforations 5, which are formed by punching so that the raised portions 5', are provided with curved cutting edges 5", which allow the cover to be removed and used as a cabbage or kraut cutter, the grooves 5ª, upon the underside forming channels by means of which the receptacle may be turned bottom upward to allow any of the unpopped corn to be sieved from the popper before finally dumping the popped corn. Thus this form of cover forms a means of separating the unpopped or unpopable corn from the popped corn.

In order to manipulate the popper, I employ the hollow substantially funnel-shaped handles 7, which are detachably secured to the receptacle by means of the bolts 8, thus making it easy to ship my popper, as the handles, and receptacles may be telescoped in dozen and half dozen lots, while the covers are placed in stacks, each to be properly assembled to form the complete popper, when the bundles reach their destination. The upper edge or lip 8ª, fits under the rolled upper edge of the receptacle and the bolt 8, when in place with the assistance of the lip 8ª, locks the handle to the receptacle. I preferably form a series of openings 9, in the upper surface of the handles, for the reception of the lugs 10, carried by the spring handle 14, respectively. By this means the lid may be held closed, half-closed or opened. The lug 10 is always pressing toward the handle and is snapped into one of the openings as the cover is manipulated.

In order to prevent the corn from adhering to the bottom of the receptacle, the receptacle 15, is provided with the two longitudinal grooves 16, at the junction of the two long sides with the bottom of the receptacle. Slidably mounted in these grooves is the scraper or agitator, 17, which is mounted transversely across the bottom of the receptacle, and has the hooked end 18, of the rod 19, which extends through the opening 20, and through the hollow handle 21, terminating in an operating handle loop or eye 22, exterior of the end of the handle. By this means by reciprocating the rod 19 the plate or agitator 17 is reciprocated within the receptacle, and thus the corn is prevented from adhering to the bottom of the receptacle.

What I claim, as new, is;—

In a corn popper, the combination of a receptacle having oppositely arranged grooves formed in its sides near the bottom, a lid for the receptacle, a hollow handle connected to and in communication with the interior of the receptacle, a strip reciprocatingly mounted in said grooves, and a rod mounted in the hollow handle and engaging said strip for operating the strip, said rod having its outer end provided with a handle, which is at all times exterior of the outer end of the hollow handle.

In testimony whereof I affix my signature in presence of two witnesses.

CHARLES GABEL.

Witnesses:
G. F. DAUDEL,
CHAS. E. DAUDEL.